United States Patent [19]

Gehrke

[11] 4,184,889

[45] Jan. 22, 1980

[54] FLY, LINE AND LEADER SINKER COMPOSITION

[76] Inventor: George E. Gehrke, Drawer 1204, Salida, Colo. 81201

[21] Appl. No.: 909,667

[22] Filed: May 25, 1978

[51] Int. Cl.² .......................................... C08L 91/00
[52] U.S. Cl. ................................. 106/267; 252/351; 43/4
[58] Field of Search .................... 106/266, 267, 243

[56] References Cited

U.S. PATENT DOCUMENTS

| | | | |
|---|---|---|---|
| 3,526,596 | 9/1970 | Kress et al. | 252/52 A |
| 3,872,048 | 3/1975 | Brown | 252/52 A |

FOREIGN PATENT DOCUMENTS 995085  6/1965  United Kingdom.

Primary Examiner—Theodore Morris
Attorney, Agent, or Firm—Max L. Wymore

[57] ABSTRACT

A composition for application to fishing flies, lines and leaders to cause them to sink when placed in water.

4 Claims, No Drawings

FLY, LINE AND LEADER SINKER COMPOSITION

One of the problems confronting the avid fly fisherman is the ability of having a fly sink fast after it is cast into the water. One solution has been to use split shot on the leader or by the use of weighted flies; however, the weighted flies do not move in a natural manner and the use of split shot on the leader makes for difficult, inaccurate and sometimes, unsafe casting. While some fly fishermen have used a sinking liquid applied to the leader, this liquid will not stay on the leader and needs to be reapplied practically for each and every cast.

The benefits and advantages of the present invention are achieved by the use of a composition of matter formulated to provide ease of application and a composition that will stay on a fly and cause it to sink rapidly for many, many successive casts and wherein the fly sinks down low to where the fish are. The sinker compound works so well and lasts such a very long time that in most instances, there is no need to use split shot or weighted flies. The composition is also an excellent leader sink and makes sinking lines sink even faster.

It is a primary object of this invention to provide a fly, line and leader sinker composition that is easy to use, wipes off fingers easily, provides rapid sinking to lines, leaders and flies and is retained thereon for a multitude of successive casts.

Another object of the invention is to provide a sinking composition that does not interfere with the natural movement of flies and will permit safe and accurate casting.

A still further object of the present invention is to provide a sinking composition many times better than previously available compositions and avoids the use of a streamer or nymph to achieve sink characteristics.

Additional benefits and advantages of the present invention become apparent upon the reading of the description of the preferred embodiment.

The fly, line and leader sinker composition according to this invention consists of about four parts by volume of Surfonic N-40 surface active agent, about one part by volume of Span 20 and about ten parts by weight of a mineral oil. The composition may also contain a small amount of cod liver oil for scent purposes, a small amount of mineral oil and a small amount of Aerosil 200 as a thickening agent. These ingredients are mixed together to form a highly viscous liquid product.

The Surfonic N-40 is manufactured by Jefferson Chemical Company, Inc. and is available from VanWaters & Rogers, division of Univar, 4300 Holly St., Denver, Col. 80216. Surfonic N-40 surface active agent is a non-ionic reaction product of ethylene oxide with nonyl phenol. The products are designated by a number following the letter "N". The number is a ten-fold multiple of the molar ratio of ethylene oxide in the adduct. The surface active properties result from the combination of the hydrophilic polyoxyethylene chain and the hydrophobic nonyl phenol. These groups combine to form a molecule which "crosses" the oil-water interface and breaks down the surface tension so as to promote a dispersion. Surfonic N-40 is water-insoluble, oil-soluble. When the Surfonic N-40 alone contacts water, the water acts with the Surfonic N-40 to produce an immiscible gel.

A surfactant Span 20 is added to the Surfonic N-40 and when mixed therewith, prevents hydration of the Surfonic N-40 from producing an immiscible gel. Span 20 is a trademark of ICI Americas, Inc., Specialty Chemicals Division, Wilmington, Del. 19897 and is used to identify a non-ionic surfactant of sorbitan monolaurate. The composition may also include about ten parts by weight of a medium grade mineral oil and a small amount of a thickness such as silica known by the trade name Aerosil 200 a product of Degussa Corp., Route 46 at Hollister Rd., P.O. Box 2004, Teterboro, N.J. 07608. The resulting composition is a thick amber liquid that can be placed on the figures and rubbed into a fly, line or leader. When a fly, line or leader treated with the composition of this invention is cast into water, the fly, line and/or leader will sink immediately and will avoid any tendency of floating on top of the water.

The line, fly and/or leader so treated can be cast and re-cast numerous times without the necessity of renewing the sinker composition.

The present invention may be embodied in other specific forms without departing from the spirit or essential characteristics thereof. The presently disclosed embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A composition of the matter to be applied to a fly, line or leader to cause same to sink below the surface of the water when cast by a fisherman which comprises about four parts by volume of a surface active agent consisting of the non-ionic reaction products of ethylene oxide with nonyl phenol, about one part by volume of sorbitan monolaurate and about ten parts by weight of a medium grade mineral oil blended together.

2. The composition of matter of claim 1 wherein the non-ionic reaction products of ethylene oxide with nonyl phenyl has a molar ratio of ethylene oxide in the adduct, of four.

3. The composition of matter of claim 1 including a small amount of cod liver oil and a silica thickener.

4. A method of treating a line or fly to promote sinking when cast in water which comprises applying a composition thereto of about four parts by volume of a surface active agent consisting of the non-ionic reaction products of ethylene oxide with nonyl phenol and mixing about one part therewith of sorbitan monolaurate to prevent the formation of an immersible gell between the reaction products and the water.

* * * * *